United States Patent
Khalfay et al.

(10) Patent No.: US 7,039,875 B2
(45) Date of Patent: May 2, 2006

(54) COMPUTER USER INTERFACES THAT ARE GENERATED AS NEEDED

(75) Inventors: Afzal Khalfay, Highlands Ranch, CO (US); Steve Sheu, Littleton, CO (US); Sia Rahimi, Aurora, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 791 days.

(21) Appl. No.: 09/727,569

(22) Filed: Nov. 30, 2000

(65) Prior Publication Data

US 2002/0063734 A1    May 30, 2002

(51) Int. Cl.
  *G06F 3/00* (2006.01)
(52) U.S. Cl. ........................ 715/762; 715/744; 715/811
(58) Field of Classification Search ........ 345/744–747, 345/762, 763, 811, 825–826, 769, 749–748, 345/755, 759, 760, 854; 717/100; 709/219; 707/101, 102; 715/707, 744, 745, 762, 765, 715/769, 789, 811
See application file for complete search history.

(56) References Cited

U.S. PATENT DOCUMENTS

| | | | |
|---|---|---|---|
| 5,530,865 A * | 6/1996 | Owens et al. ................ 345/803 |
| 5,956,736 A * | 9/1999 | Hanson et al. .............. 345/769 |
| 6,016,499 A * | 1/2000 | Ferguson ..................... 707/102 |
| 6,173,316 B1 * | 1/2001 | De Boor et al. ............. 345/784 |
| 6,178,549 B1 * | 1/2001 | Lin et al. ..................... 717/124 |
| 6,249,905 B1 * | 6/2001 | Yoshida et al. .............. 345/744 |
| 6,397,206 B1 * | 5/2002 | Hill et al. ....................... 707/2 |
| 6,397,384 B1 * | 5/2002 | Briggs ......................... 717/165 |
| 6,401,114 B1 * | 6/2002 | Jenkins ........................ 709/219 |

* cited by examiner

Primary Examiner—Ba Huynh
Assistant Examiner—Truc T. Chuong

(57) ABSTRACT

A computer user interface generation system and method is disclosed, wherein computer user interfaces can be generated dynamically during activation of the computer application for which the generated user interface provides user access to the functional features of the application. The generated user interface may be a graphical user interface (GUI) that uses instances of various user interaction techniques. A user interface specification is provided in a configuration database for generating the user interface, and by changing the user interface specification in the configuration database, the user interface for the computer application can be changed during activation of the application.

2 Claims, 4 Drawing Sheets

COMPUTER USER INTERFACES THAT ARE GENERATED AS NEEDED

RELATED FIELD OF THE INVENTION

The present invention relates to computer user interfaces, and in particular, to a computer user interface that can be dynamically generated during an activation of a computer application to which the user interface provides access.

BACKGROUND OF THE INVENTION

Prior art graphical user interface (GUI) creation techniques allow users to create static GUIs, wherein each such GUI, once deployed as the user interface to an application, can not be substantially modified without deploying a new version of the code implementing the GUI. Said another way, the "look and feel", the user interaction techniques (e.g., drop down menus, tabbed forms, button selections, scroll bars, etc.), the overall structure and appearance of the interface (e.g., the arrangement and number of display panels, and the icon symbols), and even the natural language used in prior art GUIs are embedded within the programs of the software for each such GUI. Thus, such GUIs can be said to be substantially "code-driven" in distinction to being "data-driven" as this latter term is typically used in the art. In particular, in MICROSOFT WINDOWS based applications, files known as "resource files" (as one skilled in the art will understand) are used for such static (or code-driven) GUIs, and the resource files must be (re)-compiled prior to an end user using the GUI (and each version thereof) to thus access the application for which the GUI is intended to support. Moreover, there are various GUI development systems to assist in GUI development; however, such systems are code-generators and thus may require both new code to be generated and then (re)-compiled.

Accordingly, the problems with such prior art GUI development practices are as follows:
   a. Such static GUIs cannot be dynamically modified while the application is running;
   b. The GUI source code needs re-compilation if any modifications are made;
   c. Different GUI executables are likely required for displaying and/or receiving input in different languages.

Accordingly, it has been the practice to develop such static GUIs substantially to satisfy a single need or application.

Thus, it would be advantageous to have a method and system for generating GUIs, wherein such a GUI could be easily modified without code changes and the required steps of (re)-compiling and then reattaching the GUI to the application it is intended to support. Moreover, it would be advantageous that such a method and system that could generate different versions of a GUI dynamically while the GUI is being used to interact with the application for which it is providing the user interface functionality.

SUMMARY OF THE INVENTION

The present invention is a method and system for providing a graphical user interface (GUI) that can be dynamically changed during use of the GUI. In particular, the "look and feel", the user interaction techniques, the overall structure and appearance of the interface, and even the natural language used can be changed during the intended use of GUIs generated by the present invention. That is, a GUI provided by the present invention may be dynamically (re)configured and:

a. Does not require code compilation;
   b. Does not require additional code to be written to provide any of the following GUI operations:
      i. Create a new screen;
      ii. Modify a screen;
      iii. Add new controls to an existing screen;
      iv. Modify controls on an existing screen;
      v. Add/modify screen dependencies;
      vi. Group dependency screens and associate the grouping to a selected item (e.g., an icon);
      vii. Create new (screen) labels in different languages;
      viii. Modify existing (screen) labels;
      ix. Add/modify action buttons;
      x. Add/modify application bar buttons;
      xi. Add/modify menu/submenu bar options;
      xii. Associate controls to elements of appropriate objects;
      xiii. Define a list of (GUI) controls;
      xiv. Associate a list of control columns to elements of appropriate objects,
   wherein the terms used in (i)–(xiv) above have their conventional meanings (as one skilled in the art will understand) if no other definition is provided herein.

Moreover, since the present invention also allows for the dynamic creation of GUI windows, the present invention is able to use the same screen configuration to display such windows layouts left-to-right for Latin language-based GUIs, and right-to-left for middle-eastern language-based GUIs. Additionally, the present invention generates GUIs wherein the position and number of view/panels/splitters is dynamically configurable and capable of being dynamically determined. Furthermore, custom views can be created and added to an application dynamically while the GUI (or a version thereof) is being used for interacting with the application for which the GUI supplies user interaction support.

To provide such dynamic (re)configuration and/or (re)generation of GUIs, the present invention uses user interaction templates (e.g., for screens, forms, dialog boxes, hierarchical tree views of, e.g., files and/or menus, etc.), wherein such templates maybe provided in, e.g., a central configuration data base. In particular, such templates may specify a common or uniform set of user interaction techniques for interacting with an application substantially independently of the user's language, culture or the geographical region he/she is located. Moreover, since GUIs generated by the present invention are object oriented, object functionality inherited from, e.g., the MICROSOFT WINDOWS operating system can provide substantial GUI functionality. For example, since GUI screen controls provided by the present invention are inherited objects, e.g., from the MICROSOFT WINDOWS operating system, these objects can be enhanced to provide advanced formatting and masking based on configuration settings.

It is also in aspect of the present invention that each such generated GUI is substantially independent of both the application it supports and the data model for the application. Additionally, note that the present invention can used to create graphical user interface (GUI) for any application that provides an application programmers interface (API), as one skilled in the art will understand.

It is also an aspect of the present invention to provide a method for presenting one or more graphical user interfaces, wherein this method includes, for each said graphical user interface (GUI) provided, the following steps (A)–(C):

(A) a step of activating an encoding of a computer application for which the GUI provides a user interactive computer display for the computer application;
(B) a step of activating a GUI generator for performing the following substeps:
  (a) a substep of retrieving, from a predetermined data repository, GUI specification information, wherein said GUI specification information includes (i) and (ii) following:
    (i) at least one GUI page definition for defining a corresponding page of said GUI, wherein said GUI page definition includes one or more occurrences of presentation data, wherein each said occurrence is related to a corresponding one of one or more GUI user interaction techniques, wherein each said user interaction technique has a distinct collection of user interactions for allowing a user to request a performance of one of a predetermined one or more actions provided by the technique;
    (ii) at least one mapping for associating a user request input to said at least one page with a corresponding application functionality that is substantially independent of a format for a display of said page;
  (b) a substep of generating, using said presentation data occurrences, a corresponding GUI encoding for each of said user interaction techniques;
(C) a step of executing each said GUI encoding for presenting a corresponding instance of said corresponding user interaction technique to the user, wherein each said instance is included in at least a portion of a GUI display of said page.

Referring to the invention description immediately above, in various embodiments, the following additional steps and features may be provided:
(A) The GUI specification information includes an identification of a natural language for use in the display of the page described hereinabove;
(B) For each of a first and second of the GUIs provided by the present invention, the corresponding GUI specification information includes data for providing a display layout wherein an ordering of GUI information on the display is substantially opposite from that of the other of said first and second GUIs;
(C) For at least a first of the GUIs, during the activation of the computer application, the page has a first GUI display obtained using a first instance of the GUI specification information, and a second GUI display obtained using a second instance of the GUI specification. Moreover, the first and second GUI displays of the page may use a different one of the GUI user interaction techniques for activating the same corresponding application functionality for the page. Additionally, each of the user interaction techniques may include a different collection of one or more of: an application bar, panels, a button, a comboBox, a groupBox, a checkBox, an actionbar, as one skilled in the art will understand;
(D) For at least one of the GUIs, an additional step may be performed for changing, in the data repository, one of the occurrences of the presentation data to a different occurrence of the presentation data, wherein during a subsequent presentation of the page, a presentation of one of the corresponding user interaction techniques for the one occurrence is changed to a presentation of a different one of the user interaction techniques. Moreover, the subsequent presentation of the page is provided without a step of linking or recompiling with the application. Additionally, there may be a step of receiving, via a communications network transmission, the different occurrence of said presentation data, wherein the communication network may be the Internet.;

It is also an aspect of the present invention to provide a system for presenting one or more user interfaces, wherein this system includes, for each of the user interfaces, the following components and features (A)–(C):
(A) A data repository for storing a first user interaction specification providing data for substantially defining one or more instances of user interaction techniques for presentation to a user interacting with a computer application, wherein each user interaction technique has a distinct collection of user interactions for allowing a user to request a performance of one of a predetermined one or more actions provided by the technique for accessing a functionality of the computer application;
(B) A user interface generator for accessing the first user interaction specification and generating a corresponding user interface for the computer application, wherein with each activation of the computer application, the user interface generator generates the corresponding user interface;
(C) For a change in the first user interaction specification within the data repository such that a first data descriptor for a first of the first user interaction techniques is changed in said first user interaction specification to a second data descriptor for a different second user interaction technique during an activation of the computer application, the user interface generator generates code for presenting the second user interaction technique in place of the first user interaction technique when the user requests access to a functionality of the computer application that had been previously accessible by the first user interaction technique during the computer application activation.

Referring to the invention description immediately above, in various embodiments, the following additional components and features may be provided:
(A) a user interface builder for allowing a user interface designer to create a second user interaction specification for replacing the first user interaction specification in the data repository, wherein the user interface builder has a user interface wherein the designer is able to drag and drop graphical representations of user interaction controls onto a page of the second user interface;
(B) There is an instance of the data repository and an instance of the user interface generator at each of a plurality of remote Internet sites, wherein for each instance, DB, of the data repository, the first user interaction specification therein identifies a user interface layout and language that is preferable to a user at the Internet site for DB;

It is also an aspect of the present invention to provide a system for presenting one or more user interfaces, wherein this system includes, for each of the user interfaces, the following components and features (A)–(D):
(A) A data repository for storing a first user interaction specification for substantially defining one or more instances of user interaction techniques for presentation to a user interacting with a computer application, wherein each user interaction technique has a distinct collection of user interactions for allowing the user to request a performance of one of a predetermined one or more actions provided by the technique for accessing a functionality of the computer application;

(B) a means for activating an encoding of the computer application for which the user interface provides a user interactive computer display for the application;

(C) a user interface generator means having the components (a) and (b) following:
  (a) a repository access module for retrieving, from the data repository, the user interface specification, wherein the user interface specification includes (i) and (ii) following:
    (i) one or more occurrences of presentation data, wherein each occurrence is related to a corresponding one of one or more of the user interaction techniques;
    (ii) at least one mapping for associating a user request input to a display of one of said user interaction techniques with a corresponding application functionality, wherein the application functionality does not require a particular user interface to be displayed to the user;
  (b) a generator for generating, using the presentation data occurrences, a corresponding user interface encoding for each of the user interaction techniques;

(D) A means for presenting an activation of the corresponding user interface encoding to the user;

(E) When one of said occurrences of said presentation data is changed in the data repository to a different occurrence of the presentation data during an activation of the computer application, the repository access module retrieves the different occurrence and the generator generates a different corresponding user interface encoding for presentation to the user of a user interface technique substantially defined by the different occurrence.

Other features and benefits of the present invention will become evident from the accompanying drawings and the Detailed Description.

DETAILED DESCRIPTION OF THE INVENTION

Figure 1:
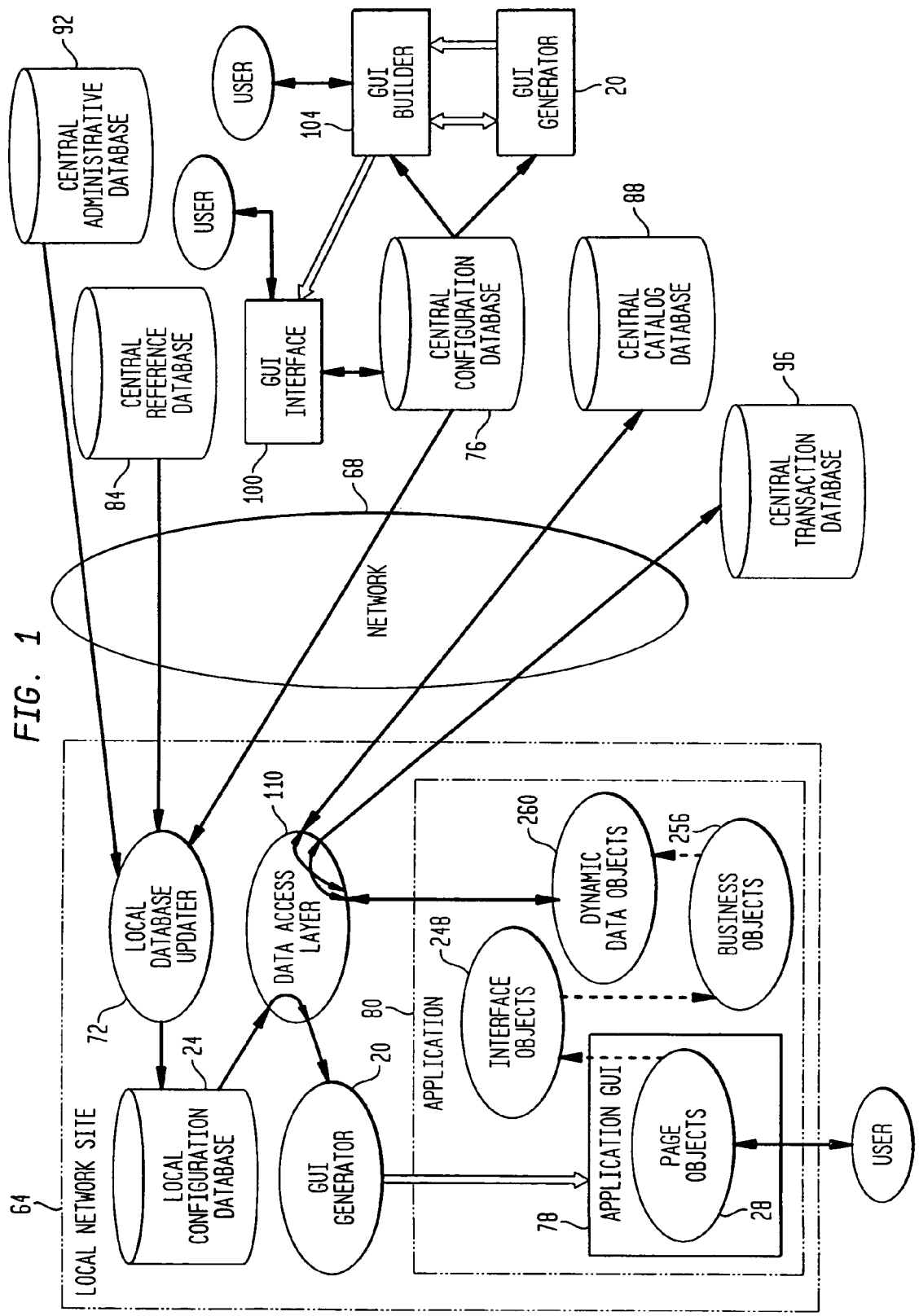
FIG. 1 is a block diagram illustrating the functional components of the present invention and how these components communicate with one another.

FIG. 1 shows the major system components of an embodiment of the present invention. They are:

(1.1) GUI generator 20: This component receives GUI specification data from, e.g., a local configuration data base 24 (described hereinbelow) and creates a GUI interface for an application during activation of the application. More precisely, GUI objects, such as "page objects" 28, are created at application runtime, wherein the GUI objects are created as necessary during the execution of the application. The page objects 28 can be used to generate screen layouts dynamically (i.e., generated when requested). Because of the dynamic nature of the elements (e.g., objects) output by the GUI generator 20, a unique command structure is provided by the output objects so that command routing may be performed from menus, toolbars, and action buttons to the associated objects being activated by a user. Note that the GUI generator 20 is also able to embed Internet browser controls into a generated GUI for thereby accessing Internet based information. Also, the GUI generator 20 generates the user interface for generating reports and report layouts.

Figure 2:
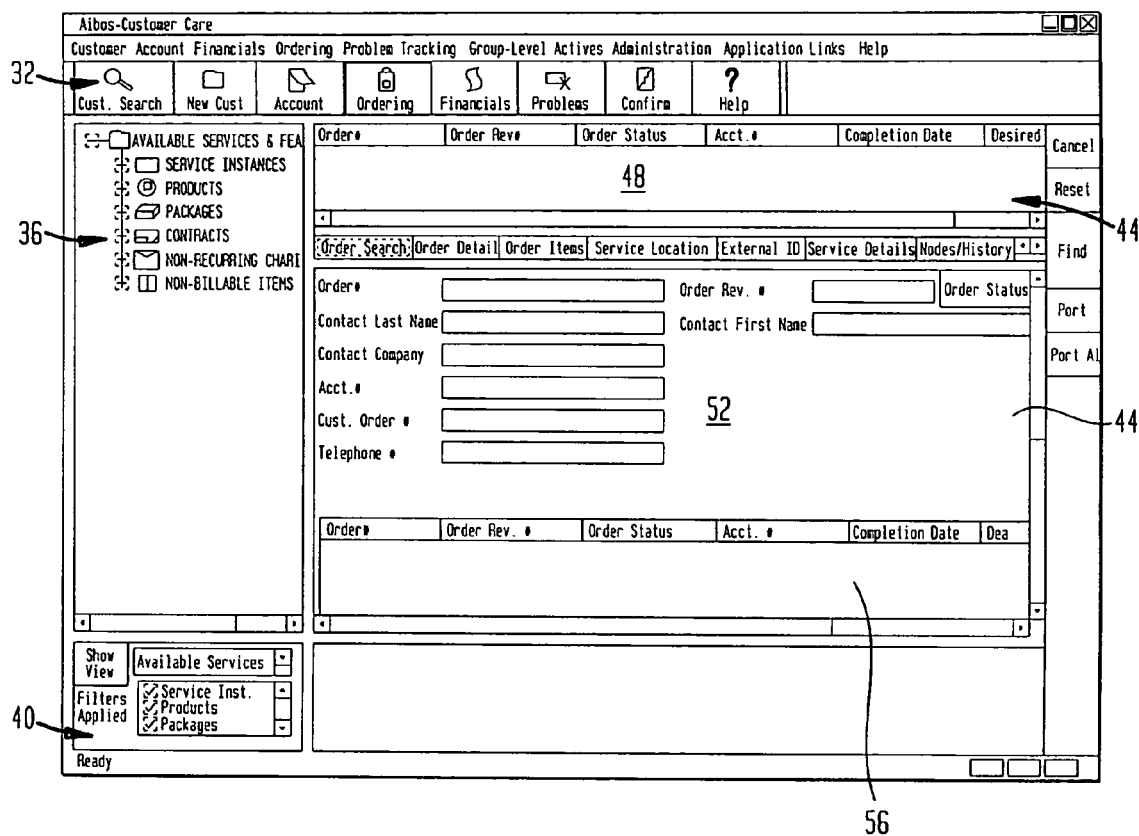
FIG. 2 is an example of a dynamically generated screen layout obtained from an output provided by the GUI generator 20.

An example of a dynamically generated screen layout is shown in FIG. 2. Below the application bar 32 of this screen layout are four panels, wherein each panel may be described as: the content of at least a portion of a display window, wherein the panel has substantially fixed (rectangular) boundaries, and wherein the panel provides the display presentation, i.e., a "view", of particular data in a particular display format given by the panel. Each of the four panels has one of the following "views" therein:

i. The top left "tree view" 36 provides a tree or hierarchical view of a hierarchically related collection of categories or types of services or products that can be selected by a user to thereby obtain further information regarding the selected service(s) or product(s).
  ii. The bottom left "category view" 40 allows the user to specify which of a plurality of hierarchically related collections is to be displayed in the top left tree view 36. Additionally, note that a filter may be applied to a selected hierarchy so that only certain collections (more precisely, their representative tree nodes) is displayed in the top left tree view 36.
  iii. The top right view 44 is a split view. The upper most panel 48 of the split view displays a list of current services or products from the user selected collection (of the tree view 36) that a particular customer is currently using. The lower panel 52 of the split view displays a form for modifying, deleting and/or creating a new service or product order record.
  iv. The bottom right view 56 displays summary information related to the customer; i.e., what of the user selected collection of services or products has the customer ordered or used in the past.

(1.2) Central databases: These databases are central repositories on the network 68 for data that is needed by the GUI generator 20 for generating GUI interfaces at each local network site 64 of the network 68 (e.g., the Internet). Note that the data is received by a local database updater 72 (described hereinbelow) at each local network site 64. In at least one typical embodiment of the present invention, the following central data bases may be provided:
  i. Central Configuration Database 76: This component is a repository for GUI specification data for GUI screens (e.g., pages) and screen functionality for one or more applications 80. In particular, for each application 80 and a corresponding GUI therefor, the following GUI specification data is stored in the central configuration database 76: a GUI to business object (i.e., functionality) mapping (embodied in instances objects of type "Interface" described hereinbelow), language specifications for the natural language in which a generated GUI interacts with a GUI user, textual information, error messages, and additional optional information. Moreover, such GUI specification data is also constructed from GUI templates contained in the central configuration database 76, wherein such templates specify common user interaction techniques (e.g., for screen layouts, forms, dialog boxes, tool bars, etc. as one skilled in the art will understand) for the resulting application user interfaces 78 generated by the present invention.

ii. Central Reference Database 84: This database includes information identifying the application to which a GUI specification (obtained from the central configuration database 76) is directed.

iii. Central Administrative Database 92: This database includes scheduling data for updating the local configuration database 24 (described hereinbelow) from the central configuration data base 76, and additionally, general constraints regarding the configuration of the GUI specification data. Note that the general constraints may be contained in a rule-base (within the central administrative database) for utilization by an expert system as one skilled in the art will understand.

iv. Central Catalog Database 88: This database includes information about a product and/or service application 80 to which a GUI specification is directed. For example, the information in this database includes contact addresses of sales representatives, product identifications, and account identifications. Although this data is, in general, relatively stable, it is more prone to change than the data in the central reference database 84 and the central administrative database 92.

v. Central Transaction Database 96: This database includes order and payment information for sales transactions entered by GUI users activating an application 80. In many embodiments, this data changes with greater frequency than any of the other data stored in the central databases described here.

(1.3) GUI Interface 100: This component is for entering and manipulating GUI specification data in the central configuration database 76. That is, the GUI interface 100 allows a user to create screen layouts, update the central configuration database 76 and preview the graphical results of GUIs in the central configuration database 76.

(1.4) GUI Builder 104: This component is for creating GUI windows for applications 80 graphically, wherein, e.g., window controls can be created and positioned by dragging and dropping graphical representations of user interaction techniques and their controls into the appropriate window page being created, as one skilled in the art will understand. In particular, the user interaction techniques having the display features of (2.1)–(2.21) hereinbelow may be specified by a user interface designer that is designing a user interface for application 80. For example, the GUI builder 104 may be used for creating the GUI interface 100. The GUI builder 104 may be, in turn, created using an instance of the GUI generator 20 when the GUI generator accesses an appropriate portion of the central configuration database 76. Thus, the GUI generator 20 is the GUI engine for the GUI builder 104 for thereby creating the GUI interface 100.

Figure 3:
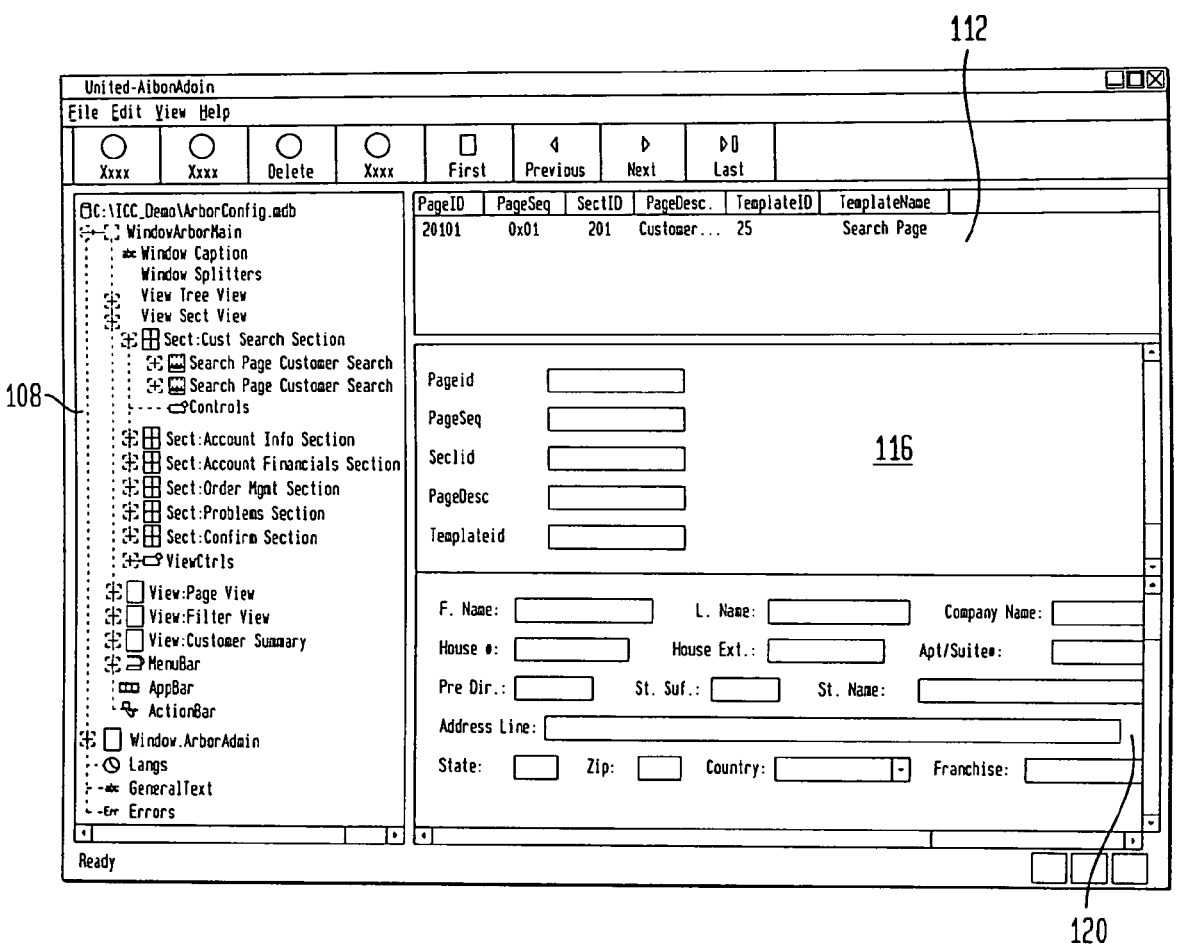
FIG. 3 is an example of a user interface for the GUI builder 104 of the present invention.

In one embodiment of the GUI builder 104, as shown in FIG. 3, the GUI interface 100 is being created therein is divided into four different panels. When the GUI builder 104 accesses a configuration hierarchy (of GUI specification data) for a particular application 80, each of the four panels displays one of the following four views of data from the configuration hierarchy:

i. A configuration hierarchy browser 108 for displaying the configuration hierarchy as a "tree view". Note that some tree nodes provide a context menu by which elements can be cut/copied/pasted.

ii. A "List View" 112 that displays the attributes and values of all objects that have been created and are of the type represented by a tree node selected in the configuration hierarchy browser 108 by a user. Note, in the embodiment of FIG. 3 there is one row per object created.

iii. A "Form View" 116 that displays a form for updating, deleting and/or creating new objects of the type represented by the tree node selected in the configuration hierarchy browser 108 by a user.

iv. A "Show View" 120 that displays, for a selected node of the tree view, a GUI preview of the attributes having a GUI display associated therewith.

User selection of the nodes in the tree view cause the following actions to occur:

(a) For the node selected, the corresponding configuration hierarchy is queried and loaded into the List View 112. Note that the columns provided in the List View 112 are dynamically generated subsequent to the user selection of the tree node.

(b) A form is dynamically generated in the Form View 112 using the GUI generator 20 and objects associated therewith, wherein the form can be used for modifying, deleting and/or creating new objects of the type represented by the selected node in the tree view.

If the objects (of the tree node selected type) are previewable (e.g., a page object), then the display form or template for the selected type is interpreted from data in the configuration hierarchy specifying how objects of the selected type are to be displayed, and the result is displayed in the Show View 120.

(1.5) Local configuration database 24: This database includes GUI specifications (e.g., specification data) received from the central configuration database 76 (via the local database updater 72) for local use in, e.g., a particular geographical region and/or for a particular culture(s) or language(s). For each GUI specification in the local configuration database 24, the information in this database includes:

ii. Configuration Data: This data includes the data described hereinabove residing in the central configuration database 76.

iii. Reference Data: This data includes the data described hereinabove residing in the central reference database 84.

iv. Administrative Data: This database includes the data described hereinabove residing in the central administrative database.

Additionally, in some embodiments, the local configuration database 24 may include relatively stable (i.e., infrequently changing) data in the following categories:

v. Catalog Data: This data includes the data described hereinabove residing in the central catalog database 88. Although this data is, in general, relatively stable, it is more prone to change than the above data categories (i)–(iii) immediately above.

vi. Transaction Data: This data includes the data described hereinabove residing in the central transaction database 96.

(1.6) Local database updater 72: This component populates the local configuration database 24 with the data needed by the GUI generator 20 for generating GUI screens and pages for the application 80. In particular, the local database updater 72 provides at least configuration data, reference data, and administrative data from the corresponding central databases 76, 84, 88, 92, and 96.

(1.7) Data Access Layer 110: This component is a database interface that retrieves and provides the retrieved data to the appropriate destination (e.g., application 80) transparently to any module or component requesting such services. Accordingly, if in some embodiments of the present invention, the local configuration database 24 provides the contact addresses of sales representatives, product identifications, and account identifications instead of the central catalog database 88 for application 80, then only data for the data access layer 110 needs to be modified to indicate that the needed catalog data is stored in the local configuration database 24.

Figure 4:
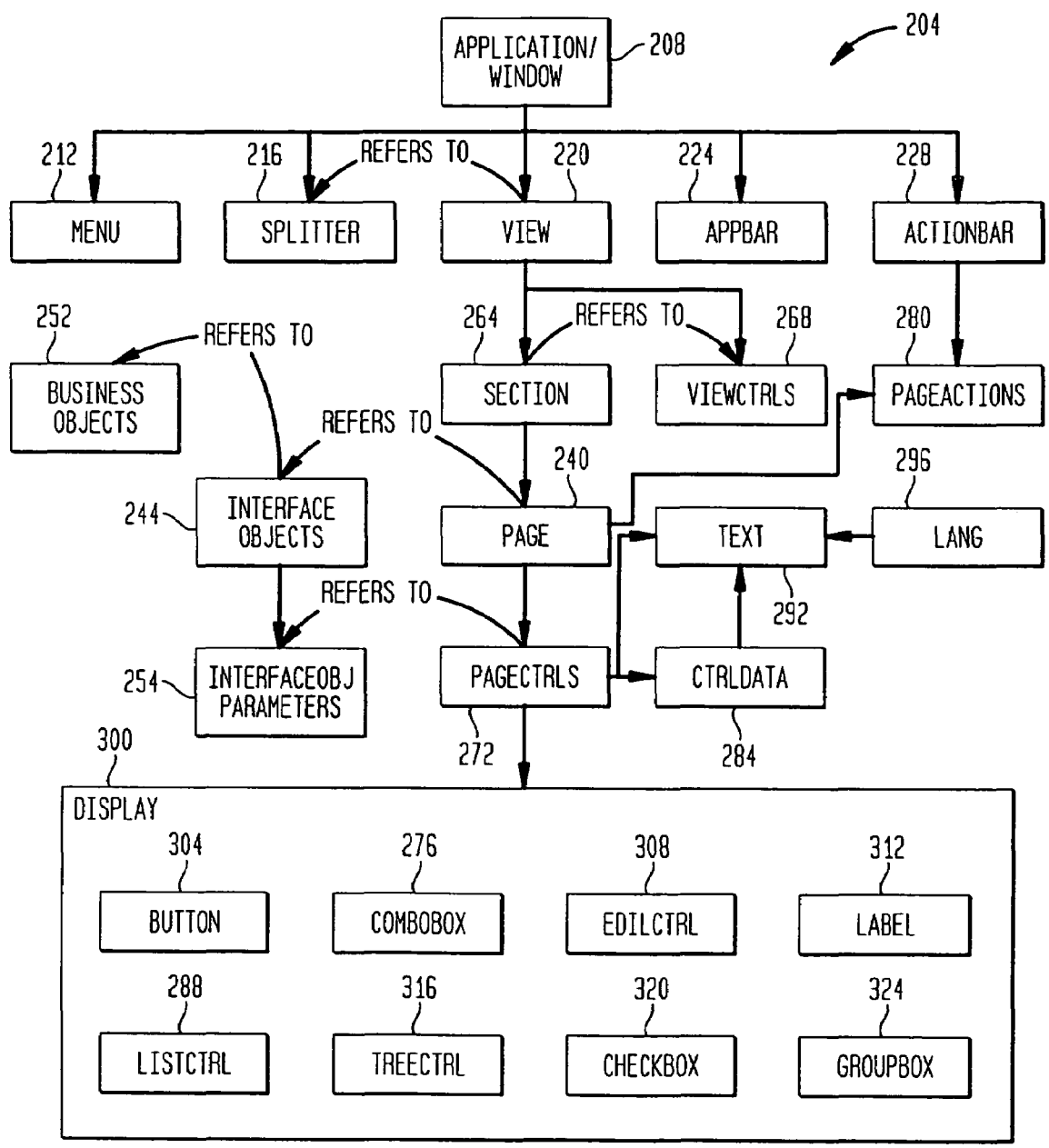
FIG. 4 a simplified version of the hierarchical (object oriented) data model 204 for defining GUI specification data and storing such specification data in the central and local configuration databases 24 and 76.

Note that in FIG. 4 a simplified version of the hierarchical (object oriented) data model 204 for defining GUI specification data and storing such specification data in the central and local configuration databases 24 and 76 is shown. Accordingly, object instances from this data model 204 (also denoted a "configuration hierarchy") are the object types that are used by the GUI generator 20 in generating GUIs. The Application/Window 208 is a highest level GUI specification object type. Accordingly, Application/Window 208 objects can include instances of the following objects:

(2.1) Instances of one or more objects of type menu 212 (FIG. 4) displaying corresponding menus on a GUI generated by the present invention. A menu object may include: (i) a display structure for designating the menu navigational structure of menus in the generated GUI, (ii) the content for identifying each menu item including the menu text to be displayed, and (iii) for each menu item, the menu command to be activated when a user activates the menu item. Note that sub-menus specified by a menu object are divided into first and second groups of sub-menus. The first group of sub-menus (denoted herein as the application group) includes sub-menus that are substantially customizable in the central configuration database 76. Thus, a user may define the menu structure, menu item contents, and the functionality activated for each menu item. The second group of sub-menus (denoted herein as the system group) includes sub-menus which provide specific interfaces to system functions. Thus, only the textual information in sub-menus of the system group may be altered (e.g., to change the display language of menu items).

(2.2) Instances of one or more objects of type splitter 216 that designate how a user interface window is to be subdivided into adjacent subwindows or panels that open, and close simultaneously as one window, and that likely have functional relationships therebetween. Objects of type splitter 216 define the number and the disposition of the panels within them. The GUI generator 20 provides for up to two levels of splitter objects, allowing for theoretically sixteen views appearing next to each other, however, more or less than two levels are within the scope of the invention. Thus, more or less than the maximum number of sixteen views are within the scope of the invention.

(2.3) Instances of one or more objects of type View 220, wherein such objects designate displays that appear in a panel of a splitter 216 object.

(2.4) Instances of one or more objects of type AppBar 224, wherein each such object is represents a user interface toolbar that can be displayed with a corresponding application/window 208 object. Note that such an AppBar 224 object may be docked at any position as well as remain floating, as one skilled in the art will understand. Further note, for such an object, the toolbar text, the corresponding toolbar commands as well as the toolbar icons may be specified in the configuration data bases 24 and 76.

(2.5) Instances of one or more objects of type Actionbar 228, wherein each such object of this type designates a user interface bar allowing a user to activate at least one user interface command. Each Actionbar 228 object has a vertically oriented longest side and may only be docked on the right of the left borders of the display for its (object oriented) parent application/window 208. The text of an Actionbar 228 object, and the page (obtained from a "Page" object described hereinbelow) which is mapped to the Actionbar object may be specified in the configuration database 24.

(2.6) Instances of one or more objects of type Page 240, wherein each such Page 240 object (also denoted "pages") designates a display page for displaying as part of a GUI generated by the present invention. Note that, as one skilled in the art will understand, each Page 240 object identifies the page controls, page actions, and/or interface objects that are used in displaying and/or activating commands provided by the page display. Page 240 objects have knowledge of which objects of type Interface 244 (described hereinbelow) should be used for each required service.

(2.7) Instances of one or more objects of type Interface 244, wherein each of these objects (denoted Interface objects 248 in FIG. 1) provide configurability, and extensibility to the application 80 by insulating the application "back-end" (i.e., the non-GUI) functionality for performing requested user actions input to the application GUI 78. That is, the Interface 244 objects provide a substantially stable interface between: (i) the application GUI 78 objects, and (ii) the non-GUI objects used to perform the actions requested via the application GUI. Thus, the Interface 244 objects insulate set of GUI objects and the set of non-GUI objects from one another so that changes to one of these sets does not affect the other set. In particular, each Interface 244 object is a wrapper of one or more objects of type Business 252 (described further hereinbelow), wherein each such Business 252 object performs and/or controls a collection of tasks whose results are meaningful in the semantics of the a well-defined or consistent state. Thus, each Interface 244 object: (i) provides a mapping (e.g., a table) between its referenced Business 252 objects and the screen page of the corresponding generated GUI that references the Interface 244 object, (ii) collects parameter values from GUI objects, (iii) invokes appropriate Business 252 object methods, and/or (iv) returns resulting values for display to a user. Moreover, each Interface 244 object may include one or more objects of the (object oriented) class hierarchy type Interface Object Parameters 254 that provide the attributes for the Interface object. In particular, objects of Interface Object Parameters 254 type provide the coordinating and the exchanging of parameter values between the GUI objects and the Business 252 objects. For instance, objects of the Interface Object Parameters 254 type have "set" and "get" methods for exchanging data with corresponding GUI objects of type "Page Control" (described further hereinbelow) that reference the such Interface Object Parameters 254 objects.

(2.8) Instances of one or more objects of type Business 252, wherein such objects (denoted Business objects 256 in FIG. 1) provide and/or control the application specific non-GUI computations for performing actions requested by a user. Such application specific objects typically encode computations that are application specific. More precisely, such Business 252 objects utilize user input and application specific information from one or more databases (e.g., the central transaction database 96) to subsequently output (to the user and/or such databases) application specific information determined by the Business 252 objects. Thus, where the objects of the application GUI 78 are directed to the form of presentation and interaction, the Business 252 objects are directed to the substance of the application. Accordingly, the Business 252 objects reference (or activate) objects of the type "Dynamic Data" 260 (FIG. 1), wherein these latter objects are used to access the central transaction database 96 and insulate the Business 252 objects from database changes that could otherwise affect the encoding of the Business 252 objects.

(2.9) Instances of one or more objects of type Section 264, wherein each such object (also denoted a "section") designates (and graphically represents) a grouping of view controls and pages provided by one or more View 220 objects. Note that Section 264 objects are in the standard tabbed from view, as one skilled in the art will understand.

(2.10) Instances of one or more objects of type View Control 268 (ViewCtrls), wherein each such object designates the controls that can be used for changing the display of a Section 264 object. For instance, there may be View Control 268 objects that provide scrolling of a Section 264 object, closing of a view (i.e., a View 220 object), or changing the size of a view.

(2.11) Instances of one or more objects of type Page Controls 272 (PageCtrls), wherein each such object defines one or more editable (GUI) boxes (e.g., CheckBox 320, or GroupBox 324), and/or comboBoxes 276 that can appear on the screen with the page(s) to which the object is associated, as one skilled in the art will understand. Each Page Controls 272 object provides one or more attributes that can be defined by a GUI designer of the Page 240 object associated with one of the Page Controls 272 objects. The attributes of each Page Controls 272 object specify the exact position on the screen of the display of the Page Controls object, the size of the display of the Page Controls object, whether the data in the Page Controls object is read-only, and the justification of the data in the display of the Page Controls object. Note that, at least in some embodiments, the format specification and the masking for displaying a Page Controls 272 object may be customized for, e.g., the nationality and other locality related human factors. Thus, e.g., the display presentation of the controls on the screen can be reversed in a middle-eastern installation location of the local network site 64.

(2.12) Instances of one or more objects of type Page Actions 280 (PageActions), wherein these objects define the actions that a Page 240 object associated therewith can perform regardless of the other GUI objects of the data model 204 may be also associated therewith.

(2.13) Instances of one or more objects of type Control Data 284 (CtrlData), wherein each such object provides one of: (i) data for specifying the controls of a comboBox 276, including a list of values for populating the comboBox, and (ii) data for specifying the controls of objects of type "List Control" 288 (denoted ListCtrl in FIG. 4) for defining the GUI actions for manipulating and displaying a list of data items. Moreover, objects of type List Control 288 may include the columns to be displayed (if any) and their corresponding widths.

(2.14) Instances of one or more objects of type Text 292, wherein each such object (also denoted "text objects") provides the text to be displayed by any object obtained from the types (classes) shown in FIG. 4. In particular, each text object includes an index into a text table (not shown) and a natural language code, wherein the index and the language code (obtained from objects of type Lang 296) are used to retrieve the text to be displayed. Thus, e.g., the text for a window title, a tab, a label, or values of a comboBox 276 are specified in instances of Text 292 objects.

(2.15) Instances of one or more objects of type Display 300, wherein each such object includes one of more of various user interaction techniques, wherein for each such technique, a user can select (by a corresponding predetermined user interaction) one or more predetermined actions to be performed on data presented to the user. The following objects, well known to those skilled in the art of graphical user interfaces, may be included within a Display 300 object to provide the GUI presentation functionality of Display objects:

i. a button object (from the class Button 304), wherein such GUI objects can "pushed" by clicking thereon (via, e.g., a mouse click), thereby designating activation of a particular task or the input of a particular data response, ii. a comboBox object (from the class ComboBox 276), wherein a GUI presentation of this object includes an aggregation of one or more other GUI object presentations such as presentations of GUI objects 304–324;

iii. an edit control object (from the class EditCtrl 308);

iv. a label object (from the class Label 312);

v. a list control object (from the class ListCtrl 288), wherein this object presents a list of data items to a user, and the user may request various manipulations to the list such as reordering and/or filtering of the list according to a user selection from among one of a plurality of predetermined ordering and/or filtering criteria;

vi. a tree control object (from the class TreeCtrl 316), wherein this object presents a hierarchically ordered set of data items to a user, and the user may request various manipulations to and/or presentations of the hierarchically ordered set such: as filtering of the set so that only a desired portion of the set is presented to the user, or expanding a representation of one of the data items in the set so that additional detail is provided to the user. Moreover, such manipulations to and/or presentations of the hierarchically ordered set are performed according to a user selection from among one of a plurality of predetermined user selectable criteria;

vii. a checkBox object (from the class CheckBox 320), wherein this object presents a box for accepting a user input that typically indicates a binary input such as yes or no; and viii. a groupBox object (from the class GroupBox 324). Note that in addition to the data model of FIG. 4, the GUI generator 20 may use user interface (UI) templates for specifying how to create pages and/or sections that combine objects from various of the above data model 204 object types (i.e., classes). In particular, the following is an exemplary list of such UI templates:

(2.16) A FormListTopDown template: This UI template displays a form along with a list. The form is displayed on the upper half of the page and the list is displayed on the lower half of the page. The user can perform "cancel", "new", "update", and "deleted" actions related to items in the list by selecting a list entry for display in the form area.

(2.17) A FormTreeSideBySide template: This UI template displays a form along with a tree. The form is displayed on the right side of the page and the tree is displayed on the left side of the page. The user can perform "cancel", "new", "update", and "deleted" actions related to items in the tree by selecting a tree node for display in the form area.

(2.18) A ListOnList template: The UI template displays two lists. The first list is displayed on the top of the page and the second list is displayed on the bottom of the page. The user can perform "cancel", "new", "update", and "deleted" actions related to items in the lists by selecting a list entry for display in either list area.

(2.19) A Form template: This UI template displays a form. The form is displayed for over the entire page. The user can perform "cancel", "new", "update", and "deleted" actions related to fields in the form.

(2.20) A Tree template: This UI template displays a hierarchical or tree view of a collection of data items. The tree view is displayed for the entire page/section. The display is read only.

(2.21) An Image template: This UI template displays a graphical image. The image is displayed over the entire field of the page/section. The display is read only.

Objects of the above described data model 204 object types (a)–(n) in combination with, e.g., the UI templates (p)–(u) provide the GUI "front end" (i.e., application GUI 78) for an application 80. However, as discussed hereinabove, there are also application services and/or actions to be performed in response to a user interacting with a GUI provided by the present invention. Such application services and/or actions may access and/or modify a database (e.g., the central transaction database 96), and/or determine various values that are dependent upon data that is fundamental to the application regardless of its GUI representation. Thus the present invention, dynamically generates during application 80 execution, the GUI object of the types in the data model 204 (FIG. 4) for interacting with "back end" application services provided by, e.g., objects type Business 252.

Accordingly, through the division of responsibilities between the dynamically generated GUI objects for presentation to a user, the Interface 244 objects for processing and translation, and the Business 252 objects for implementing business rules and semantics, a flexible and easily extendable application 80 can be provided by the present invention.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. An apparatus for providing one or more user interfaces for a computer application comprising:

a data repository for storing first user interaction specification information providing data for substantially defining one or more instances of user interaction techniques for presentation to a user interacting with a computer application, wherein each said user interaction technique has a distinct collection of user interactions for allowing a user to request a performance of one of a predetermined one or more actions provided by the technique for accessing a functionality of the computer application;

a user interface generator for accessing said first user interaction specification information and generating a corresponding user interface for the computer application, wherein with each activation of the computer application, said user interface generator generates said corresponding user interface;

wherein for a change in said first user interaction specification information within said data repository such that a first data descriptor for a first of said first user interaction techniques is changed in said first user interaction specification information to a second data descriptor for a different second user interaction technique during an activation of the computer application, said user interface generator generates code for presenting said second user interaction technique in place of said first user interaction technique when the user requests access to a functionality of the computer application that had been previously accessible by said first user interaction technique; and a user interface builder for allowing a user interface designer to create a second user interaction specification information for replacing said first user interaction specification information in said data repository, wherein said user interface builder has a user interface wherein the designer is able to drag and drop graphical representations of user interaction controls onto a page of said second user interlace.

2. An apparatus for providing one or more user interfaces for a computer application, comprising:

a data repository for storing first user interaction specification information providing data for substantially defining one or more instances of user interaction techniques for presentation to a user interacting with a computer application, wherein each said user interaction technique has a distinct collection of user interactions for allowing a user to request a performance of one of a predetermined one or more actions provided by the technique for accessing a functionality of the computer application;

a user interface generator for accessing said first user interaction specification information and generating a corresponding user interface for the computer application, wherein with each activation of the computer application, said user interface generator generates said corresponding user interface;

wherein for a change in said first user interaction specification information within said data repository such that a first data descriptor for a first of said first user interaction techniques changed in said first user interaction a specification information to second data descriptor for a different second user interaction technique during an activation of the computer application, said user interface generator generates code for presenting said second user interaction technique in place of said first user interaction technique when the user requests access to a functionality of the computer application that had been previously accessible by said first user interaction technique;

wherein an instance of said data repository and an instance of said user interface generator at each of a plurality of remote internet sites, wherein for each said instance, DB, of said data repository, said first user interaction specification information therein identifies a user interface layout and language that is preferable to a user at the internet site for DB.

\* \* \* \* \*